No. 710,786. Patented Oct. 7, 1902.
E. A. LELAND.
BROILER, &c.
(Application filed Dec. 5, 1901.)
(No Model.)

Witnesses:

Inventor:
Edwin A. Leland
per
James A. Whitney
Attorney

UNITED STATES PATENT OFFICE.

EDWIN A. LELAND, OF GREAT BARRINGTON, MASSACHUSETTS, ASSIGNOR TO FRANK H. WRIGHT, OF GREAT BARRINGTON, MASSACHUSETTS.

BROILER, &c.

SPECIFICATION forming part of Letters Patent No. 710,786, dated October 7, 1902.

Application filed December 5, 1901. Serial No. 84,853. (No model.)

*To all whom it may concern:*

Be it known that I, EDWIN A. LELAND, of Great Barrington, in the county of Berkshire and State of Massachusetts, have invented certain new and useful Improvements in Broilers, &c.; and I do hereby declare that the following is a full, clear, and exact description of the same, reference being had to the accompanying drawings, making a part of this specification, in which—

Figure 1:
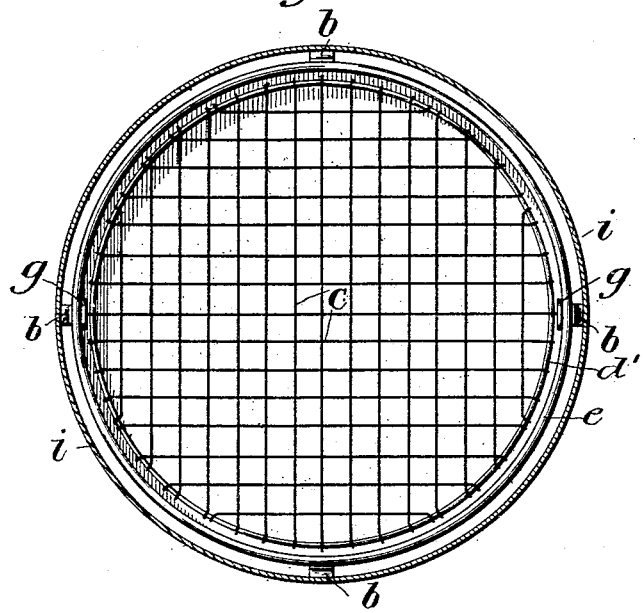
Figure 2:
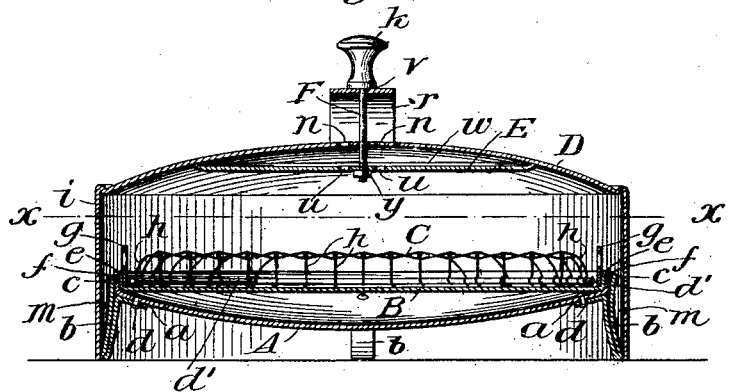

Figure 1 is a horizontal sectional view of an apparatus made according to my invention, taken in the line $x$ $x$ of Fig. 2. Fig. 2 is a central vertical sectional view of said apparatus.

The objects of this invention are to provide a simple, economically-constructed, and desirable apparatus for broiling and the like with which the upper and lower sides of the meat or other edible to be cooked are simultaneously subjected to the action of heat, thereby avoiding not only the trouble incident to turning the material, as is ordinarily practiced, but also the waste of meat-juices which necessarily occurs when meat is reversed, as upon an ordinary griddle. These objects are effectually attained by the new and useful combinations of parts included in my said invention, and which are hereinafter fully described, and set forth in the claims hereof.

A is a concave-convex baffle-pan, the periphery of which is raised, as shown at $a$ in Fig. 2. This baffle-pan is more or less elevated to permit a suitable means of heating to be applied underneath. As shown in Fig. 2, the baffle-pan is supported by legs $b$ at its circumference. The feet of these legs should be in a line substantially concentric with the circumference of the baffle-pan, for a purpose hereinafter set forth. Projected upward from the periphery of the baffle-pan are studs $c$, the object of which is herein presently explained. An economy of construction and durability of structure is obtained by making the legs $b$ and studs $c$ integral with each other and of flat metal riveted, as at $d$, to the contiguous under surface of the circumferential part of the baffle-pan, as shown in the section Fig. 2.

Placed in or upon the baffle-pan A is a bottom plate B, which has a raised rim $e$, the upper edge of which is wired, as at $f$, so that the said edge folded outward over the wire $f$ may rest upon and be supported by the periphery of the baffle-pan with the rim $e$ of the bottom plate lying within and concentric with the raised edge aforesaid of the baffle-pan. When the bottom plate is in position, as described, the studs $c$, being outside of its periphery, prevent its accidental displacement. To facilitate removal and displacement of the bottom plate, as occasion may require, it may be provided with lifting-rings $g$ at opposite sides of its circumference.

C is a wire grill, which is made of wire of any desired character and preferably interlaced and of any desired mesh—as, for example, one-half inch. While the greater surface of this grill is or may be substantially flat, its circumferential portion $h$ is depressed and at its lower edge should, for strength and durability, be fast to a periphery-wire $d'$, which stiffens and keeps in shape the circumference of the grill. It will be observed that this depressed circumference of the grill serves to support the upper and substantially flat portion of the grill in a more or less elevated position above the bottom plate B, so that a substantial proportion of flame, hot air, and gases, &c., rising from a heating device beneath the baffle-pan may pass through the depressed peripheral portion of the grill, underneath the upper or broiling part of the latter, in the manner and for a purpose herein presently described.

D is a cover, the downwardly-extended sides $i$ of which when the cover is applied in place pass outside of the legs $b$, which latter, being projected beyond the peripheral line of the baffle-plate, hold against the lower portion of the sides $i$ of the cover, and thus retain the latter concentric with the baffle-pan and the bottom plate, with a space $m$ between the circumferences of the two latter and the surrounding wall or sides $i$ of the cover, so that the flame, hot air, gases, &c., from below the baffle-pan may pass upward into the herein presently-described relation with the grill. In the top of the cover are one or more outlet-openings $n$, over which may be provided a suitable hood $r$. Fast under the top of the cover and secured thereto is a heat-reflecting plate E, which may be of sheet-tin or other bright metal. In this plate E are any desired number of holes or openings $u$, through which hot air and gases may pass from within the cover to the chamber $w$, between the reflecting-plate and the top of the cover, and thence make their escape through the outlet opening or openings $u$ of the latter. A convenient means of retaining the heat-reflecting plate and the hood in position is by means of a bolt F, which passes through the hood and the plate, with a nut $y$ at its lower end and a shoulder $v$ at its upper part, between which the hood, the top of the cover, and the deflector-plate are confined, as shown in Fig. 2. On the upper end of this bolt is a knob $k$, by which the cover may be lifted or manipulated as occasion may demand.

The parts being disposed, as described, with the cover in place and a suitable source of heat underneath the baffle-pan—as, for example, a gas-stove, or, if preferred, provided by placing the apparatus over one of the openings above the fire-pot of an ordinary cook-stove—the operation of the apparatus is as follows: The convex under surface of the baffle-pan disperses the heated air and gas radially to the space $m$ between the sides $i$ of the cover and the circumferences of the baffle-pan and the bottom plate and at the same time prevents a too intense action of the heat on the bottom plate. The heated air, gases, &c., pass in part through the open depressed circumferential part $h$, and thus below the grill, while another portion of said hot air, gases, &c., passes over the grill, thereby subjecting the articles which are on the latter simultaneously to the requisite broiling or cooking action both upon their upper and lower surfaces, the hot air, gases, &c., from below the grill passing upward from underneath the latter through the spaces of the grill not covered by the articles aforesaid. The reflecting-plate F throws back a portion of the heat from the air and gases within the cover upon the upper side of the grill, and, further, the heat of the air, gases, &c., passed into the chamber $w$ is passed by conduction through the reflecting-plate, and as radiant heat acts upon the upper surface of the articles on the grill, so that by the means described the heat is utilized to the utmost. By causing the depressed circumferential part of the grill to support at the proper height the main or operative portion of the grill a most effective and economical means of insuring the passage of the requisite portion of the hot air and gases underneath the grill to enable both sides of the articles to be simultaneously broiled is provided.

It will be noticed that as the grill, the bottom plate, the baffle-pan, and the cover are separable each from the other any of the said parts may be readily removed for convenience in cleaning or for other purposes.

What I claim as my invention is—

1. The combination with a wire grill, constructed with a depressed circumference, a bottom plate which supports the grill at its periphery and means for supporting the bottom plate at the requisite height, of a cover the sides whereof surround the grill and the bottom plate and provide a space through which a portion of hot air, gases, &c., may pass below the grill through the open depressed circumferential part of the grill, while another portion passes over the grill, as described.

2. The combination with a wire grill, constructed with a depressed circumference, a bottom plate which supports the grill at its periphery, and has an upwardly-projected rim for retaining the grill in place, of a concavo-convex baffle-pan having legs which support it at the requisite height and which receives and supports the bottom plate, and a cover the sides whereof surround the grill, the bottom plate and the baffle-pan and provide between said sides a passage through which a portion of hot air, gases, &c., may pass below the grill through the open depressed circumferential parts thereof while another portion passes over the grill, as described.

3. The combination with a wire grill, constructed with a depressed circumference, a bottom plate which supports the grill and has an upwardly-projected rim for retaining the grill in place, and a concavo-convex baffle-pan which supports the bottom plate and which has legs whereby it is itself supported at the requisite height, and a cover the sides whereof surround the parts aforesaid and provide a passage through which hot air, gases, &c., may pass to and through the open depressed circumference of the grill, of a reflecting-plate provided in the top of the cover and arranged to reflect and transmit heat above the grill, as described.

4. The combination with a wire grill, constructed with a depressed circumference, a bottom plate which supports the grill and has an upwardly-projected rim for retaining the grill in place, a concavo-convex baffle-pan which supports the bottom plate and which has upwardly-projected studs for retaining the bottom plate in position and legs for supporting the baffle-plate at the requisite height, of a cover the sides of which surround the baffle-plate and provide a passage through which hot air, gases, &c., from below the baffle-plate may pass to and through the open depressed circumferential portions of the grill, as described.

5. The combination with a wire grill, constructed with a depressed circumference, a bottom plate which supports the grill and has a circumferential rim for retaining the grill in place, a concavo-convex baffle-pan which supports the bottom plate, and a cover the sides of which surround the grill, the bottom plate, and the baffle-pan to provide a passage through which hot air, gases, &c., may pass from below the baffle-plate to and through the open depressed circumference of the grill, of legs provided to the baffle-pan and projected beyond the circumference thereof whereby the sides of the cover are held concentric with the baffle-pan to secure a practically uniform width to the passage aforesaid, as described.

6. The combination with a grill composed of interlaced wires and having a depressed circumference, a bottom plate which supports the grill and has a circumferential rim for retaining the grill in place, a concavo-convex baffle-pan which supports the bottom plate, a cover the sides of which surround the baffle-pan, the bottom plate, and the grill to provide a passage through which hot air, gases, &c., may pass to and through the depressed circumference of the grill to the under side of the latter, and legs for supporting the baffle-plate at the requisite height and for holding the sides of the cover in proper relation with the baffle-plate, of a reflector in the top of the cover arranged to reflect and to transmit heat to the upper side of the grill, as described.

7. The combination with a grill composed of interlaced wires and having a depressed circumference, a bottom plate which supports said grill and which has a circumferential rim to retain the grill in place, and a baffle-pan which supports the bottom plate, and a cover the sides of which surround the baffle-plate, the bottom plate and the grill to provide a passage through which hot air, gases, &c., may pass from below the baffle-pan to and through the open depressed circumferential parts of the grill, of a reflecting-plate in the upper part of the cover and communicating with a chamber between said plate and the top of the cover, a hood over the outlet from the cover, and a screw and nut which extend through the hood and the reflecting-plate to attach both to the top of the cover, as described.

EDWIN A. LELAND.

Witnesses:
  J. C. FREIN,
  JOHN BETTIS, Jr.